United States Patent
Suenaga et al.

(10) Patent No.: US 12,177,226 B2
(45) Date of Patent: Dec. 24, 2024

(54) AUTHENTICATION MANAGEMENT METHOD, AUTHENTICATION MANAGEMENT PROGRAM, AND USER AUTHENTICATION MANAGEMENT DEVICE

(71) Applicant: DENSO CORPORATION, Kariya (JP)

(72) Inventors: Yuri Suenaga, Kariya (JP); Hiroyuki Sato, Nagoya (JP); Hiroshi Mizuno, Nagoya (JP)

(73) Assignee: DENSO CORPORATION, Aichi-pref. (JP)

( * ) Notice: Subject to any disclaimer, the term of this patent is extended or adjusted under 35 U.S.C. 154(b) by 615 days.

(21) Appl. No.: 17/486,980

(22) Filed: Sep. 28, 2021

(65) Prior Publication Data
US 2022/0103568 A1    Mar. 31, 2022

(30) Foreign Application Priority Data

Sep. 30, 2020    (JP) ................... 2020-165367

(51) Int. Cl.
*H04L 9/40* (2022.01)
(52) U.S. Cl.
CPC ........ *H04L 63/105* (2013.01); *H04L 63/0853* (2013.01); *H04L 63/205* (2013.01); *H04L 2463/082* (2013.01)
(58) Field of Classification Search
CPC . H04L 63/105; H04L 63/0853; H04L 63/205; H04L 2463/082
See application file for complete search history.

(56) References Cited

U.S. PATENT DOCUMENTS

| | | | | |
|---|---|---|---|---|
| 10,035,494 B2 * | 7/2018 | Sute | ................... | G07C 9/00174 |
| 10,542,383 B2 * | 1/2020 | Santavicca | ............ | B60R 25/245 |
| 2017/0011572 A1 * | 1/2017 | Link, II | ................ | H04W 12/06 |
| 2017/0339111 A1 * | 11/2017 | Balabine | ............... | H04L 9/0861 |
| 2018/0053362 A1 * | 2/2018 | Decke | ....................... | G07C 9/28 |
| 2018/0285544 A1 * | 10/2018 | Chang | ................... | G06V 40/172 |
| 2019/0047512 A1 * | 2/2019 | Gersabeck | ............. | B60R 25/24 |
| 2020/0068400 A1 * | 2/2020 | Ramic | ................... | H04L 63/107 |
| 2020/0151978 A1 * | 5/2020 | Gattu | ................. | G07C 9/00309 |
| 2020/0307515 A1 * | 10/2020 | Hiruta | ..................... | G06F 21/31 |
| 2020/0389325 A1 * | 12/2020 | Nakajima | ............. | H04L 9/3242 |
| 2021/0138982 A1 * | 5/2021 | Schumacher | ........... | H04L 63/08 |

FOREIGN PATENT DOCUMENTS

| | | | | |
|---|---|---|---|---|
| CN | 107612880 A | * | 1/2018 | |
| DE | 102012022786 A1 | * | 5/2014 | ........ H04L 63/0853 |
| JP | 2020-069966 A | | 5/2020 | |

* cited by examiner

*Primary Examiner* — Michael R Vaughan
(74) *Attorney, Agent, or Firm* — Harness, Dickey & Pierce, P.L.C.

(57) ABSTRACT

An authentication management method includes: generating an authentication state based on an authentication result by an authentication terminal, an authentication rule or rules and identity information, and notifying a vehicle application of the generated authentication state. An authentication rule stored in a storage defines a plurality of authentication levels according to security levels, and authentication by an authentication element in at least one of the authentication levels includes possession authentication by a hardware encryption module with physical security.

12 Claims, 8 Drawing Sheets

FIG. 4

| USER ID | USER ATTRIBUTE | AUTHENTICATION DEVICE MANAGEMENT ID ||||
| | | PASSWORD | FOB KEY | SMARTPHONE KEY | FACE AUTHENTICATION |
|---|---|---|---|---|---|
| 001 | OWNER (USER ITSELF) | 001A | 001B | 001C | 001D |
| 002 | FAMILY | 002B | — | 002C | 002D |

FIG. 5

| AUTHENTICATION LEVEL | 1ST AUTHENTICATION ELEMENT | 2ND AUTHENTICATION ELEMENT |
|---|---|---|
| LEVEL 1 | MEMORY AUTHENTICATION | — |
| LEVEL 1 | POSSESSION AUTHENTICATION | — |
| LEVEL 2 | POSSESSION AUTHENTICATION | MEMORY AUTHENTICATION |
| LEVEL 2 | POSSESSION AUTHENTICATION | BIOMETRICS AUTHENTICATION |
| LEVEL 3 | POSSESSION AUTHENTICATION (HARDWARE ENCRYPTION MODULE) | MEMORY AUTHENTICATION |
| LEVEL 3 | POSSESSION AUTHENTICATION (HARDWARE ENCRYPTION MODULE) | BIOMETRICS AUTHENTICATION |

FIG. 6

| AUTHENTICATION ELEMENT | AUTHENTICATION METHOD |
|---|---|
| MEMORY AUTHENTICATION | PASSWORD |
| POSSESSION AUTHENTICATION | FOB KEY AUTHENTICATION |
| POSSESSION AUTHENTICATION (HARDWARE ENCRYPTION MODULE) | SMARTPHONE KEY AUTHENTICATION |
| BIOMETRICS AUTHENTICATION | FACE AUTHENTICATION |

AUTHENTICATION MANAGEMENT METHOD, AUTHENTICATION MANAGEMENT PROGRAM, AND USER AUTHENTICATION MANAGEMENT DEVICE

CROSS REFERENCE TO RELATED APPLICATION

The present application is based on and claims the benefit of priority of Japanese Patent Application No. 2020-165367, filed on Sep. 30, 2020, the disclosure of which is incorporated herein by reference.

TECHNICAL FIELD

The present disclosure generally relates to a technique for managing an authentication state of a user.

BACKGROUND INFORMATION

A comparative vehicle authentication system is used in a vehicle that outputs an answerback sound when a door of the vehicle is unlocked, including a mobile terminal carried by a user and an in-vehicle device used in the vehicle. In such vehicle authentication system, the in-vehicle device performs various processes related to authentication in the vehicle by executing a control program stored in a memory/storage device.

SUMMARY

It is an object of the present disclosure to provide an authentication management method, an authentication management program stored in a non-transitory, tangible memory, and a user authentication management device that can ensure security for the execution of a vehicle application while realizing centralized management of the authentication state.

BRIEF DESCRIPTION OF THE DRAWINGS

Objects, features, and advantages of the present disclosure will become more apparent from the following detailed description made with reference to the accompanying drawings, in which:

FIG. 4 is a diagram of identity information;

FIG. 5 is a diagram of an authentication rule;

FIG. 6 is a diagram of authentication elements and authentication methods;

DETAILED DESCRIPTION

Figure 1:
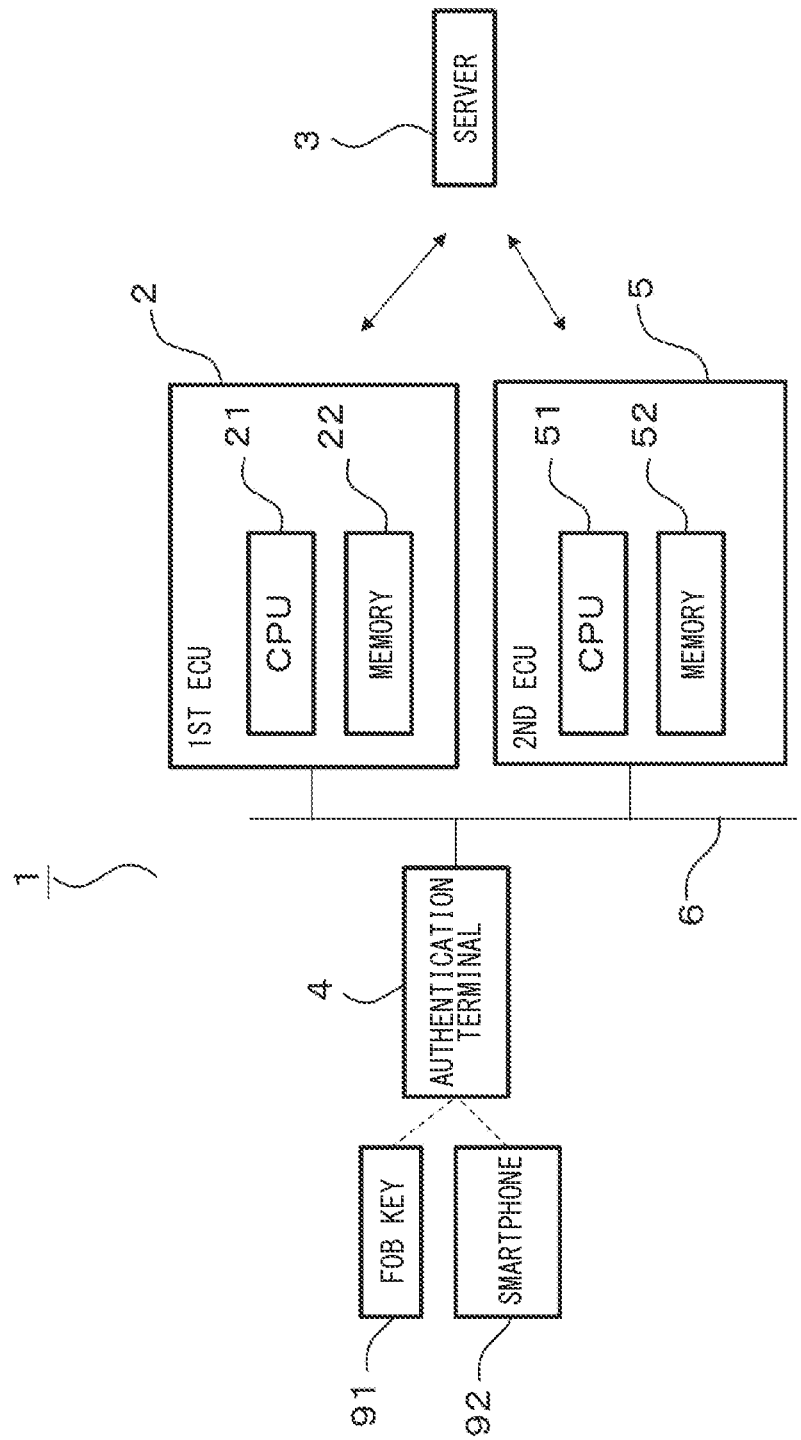
FIG. 1 is a block diagram of a configuration of a user authentication system.

The following will describe embodiments of the present disclosure with reference to the drawings. A configuration of a user authentication system 1 according to an example of the present disclosure will be described with reference to FIG. 1. FIG. 1 is a block diagram showing an outline configuration of the user authentication system 1. The user authentication system 1 includes a first ECU 2, a server 3, an authentication terminal 4, and a second ECU 5. The first ECU 2, the authentication terminal 4, and the second ECU 5 are communicably connected by an in-vehicle network 6. The first ECU 2 and the server 3 are connected as wirelessly communicable. The second ECU 5 and the server 3 are connected as wirelessly communicable. In FIG. 1, it is described that the server 3 and the first ECU 2 or the second ECU 5 are communicating with each other, but in the vehicle, the first ECU 2 or the second ECU 5 may use a common communication module (not shown) to wirelessly communicate with an external device outside the vehicle. Further, in FIG. 1, the server 3 is described as one server 3 for convenience, but may be a plurality of servers 3. The ECU includes a processor, a memory, an I/O, and a bus connecting these, and performs various processes by executing a control program stored in the memory. Note that the memory is a non-transitory, tangible storage medium that stores programs and data that can be read by a computer non-transitorily. Further, the non-transitory, tangible storage medium is realized by a semiconductor memory, a magnetic disk, or the like. The ECU corresponds to an electronic control device.

In FIG. 1, the first ECU 2 includes a CPU 21 and a memory 22. The memory 22 stores an authentication management program, and when the first ECU 2 executes the authentication management program, the function of a user authentication management device 7 (shown in FIG. 3) is realized. In the present embodiment, the user authentication management device 7 is described as software, but a part or all of the user authentication management device 7 may be configured as hardware. The user authentication management device 7 may be FOB key 91, or may be smartphone 92.

The configuration and functions of the server 3 will now be described. The server 3 corresponds to, for example, a data management center provided outside the vehicle. The server 3 is also called a cloud or a center. The server 3 includes a user management function, an authentication rule management function, and an authorization policy management function. In addition, each function may be provided in different data management centers, or may be provided in one data management center.

The user management function manages user information and user attribute definitions. Specifically, the user management function can issue a user ID and delete the user ID. The user management function can register a user attribute definition and can change the user attribute definition. Note that the user management function transmits the user attribute definition to the user authentication management device 7 and sets it thereto when initial data is delivered to the vehicle.

The authentication rule management function manages authentication rules. Specifically, the authentication rule management function can register an authentication rule and can change the authentication rule. The authentication rule management function transmits and sets the authentication rule to the user authentication management device 7 at the time of initial data distribution to the vehicle.

The authorization policy management function manages authorization policies. More specifically, the authorization policy management function can register an authorization policy and can change the authorization policy. The authorization policy management function sets the authorization policy in each of function control applications at the time of initial data distribution to the vehicle. The function control application corresponds to a vehicle application that controls vehicle functions. The authorization policy specifies, for example, an authentication level and user attributes required to execute the function control application. For example, as an authorization policy for executing a function X1 of a function control application X, an authentication level=level 1 and a user attribute=owner, family are specified.

The authentication terminal 4 will be described in the following. The authentication terminal 4 manages authentication information for authenticating a user or a terminal. The authentication terminal 4 authenticates the user or the terminal from a sensing result of the device. When the authentication terminal 4 receives an authentication request from the user authentication management device 7, the authentication terminal 4 senses the device and notifies the user authentication management device 7 of an authentication result. The authentication result includes information indicating that the authentication is successful or unsuccessful. For example, the authentication terminal 4 is configured to transmit a management ID associated with the authentication information of the authentication terminal 4 when the authentication is successful, and not to transmit the management ID associated with the authentication information of the authentication terminal 4 when the authentication is unsuccessful.

The authentication terminal 4 includes a communication terminal and an input terminal device used in the following authentication, e.g., smartphone key authentication, fob key authentication, face authentication, and password authentication. Although one authentication terminal 4 is shown in FIG. 1 for convenience, a plurality of authentication terminals 4 may be usable. The fob key authentication is an authentication performed between the fob key 91 and the authentication terminal 4. The smartphone key authentication is an authentication performed between a smartphone 92 and the authentication terminal 4. Password authentication is an authentication performed by inputting a password to the authentication terminal 4. The face authentication is an authentication performed between a face and the authentication terminal 4. The fob key 91 and the smartphone 92 are examples of an authentication device.

Figure 2:
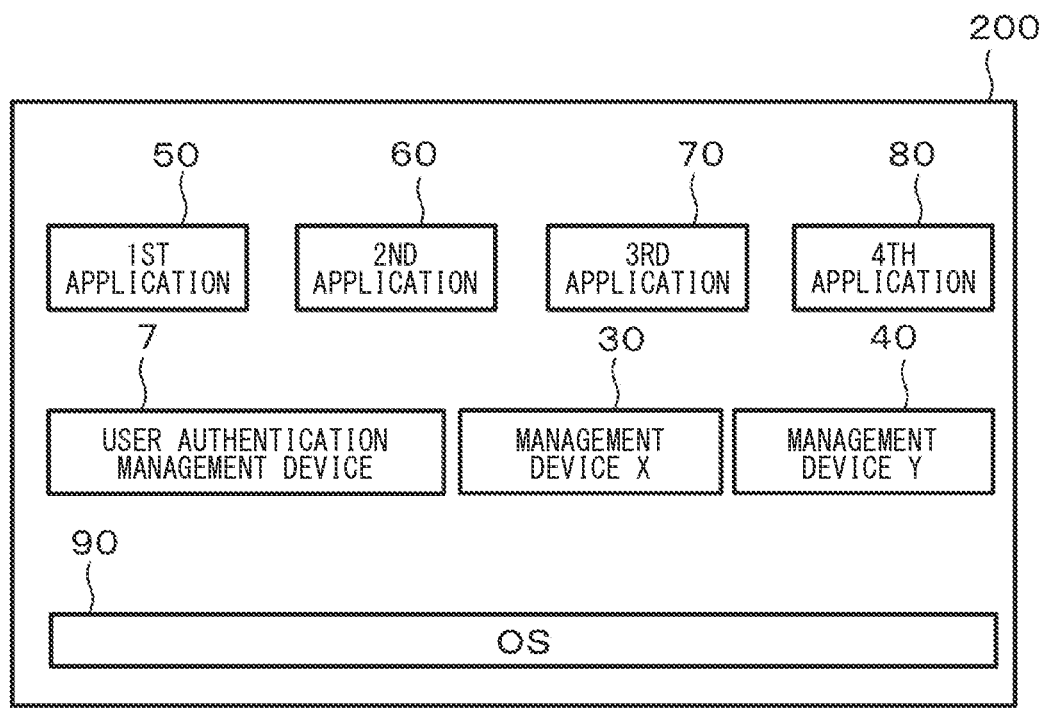
FIG. 2 is a diagram of a logical architecture including a network coordinator.

FIG. 2 illustrates a logical architecture 200 including the user authentication management device 7. In a vehicle, middleware such as the user authentication management device 7, a management device X 30, and a management device Y 40 operates on an OS (operating system) 90. Note that the management device is called middleware, a coordinator, a management module, a manager, or the like. A first application 50, a second application 60, a third application 70, and a fourth application 80 operate by using services provided by one or more management devices, and provide functions for various applications. Note that the OS 90 may be a virtual OS. Further, the application, the management device, and the OS may be executed by the same electronic control device or may be executed by different electronic control devices. FIG. 2 is an example, and the number of OSs, management devices, and applications is not limited to such an example.

Figure 3:
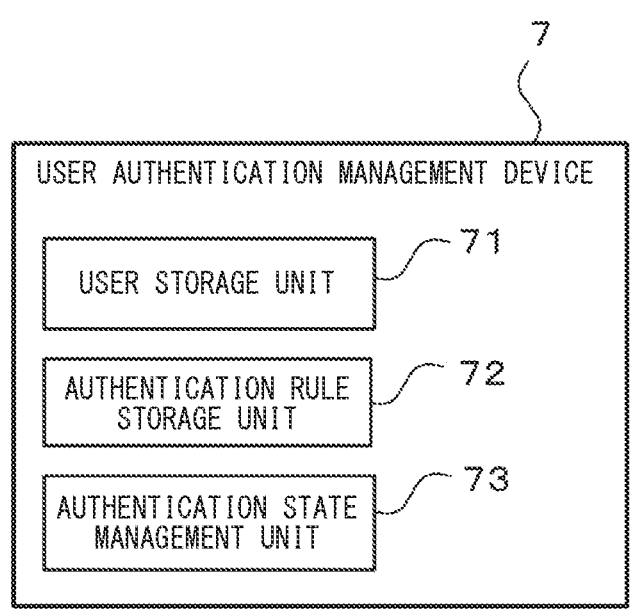
FIG. 3 is a block diagram of a configuration of a user authentication management device.

The user authentication management device 7 will be described with reference to FIG. 3. FIG. 3 is a block diagram showing a configuration of the user authentication management device 7. The user authentication management device 7 includes a user storage unit 71, an authentication rule storage unit 72, and an authentication state management unit 73. The authentication rule storage unit 72 corresponds to a first storage unit, the user storage unit 71 corresponds to a second storage unit, and the authentication state management unit 73 corresponds to an authentication control unit.

The authentication rule storage unit 72 manages the authentication rule. The authentication rule storage unit 72 is configured to set an authentication rule by the server 3. The authentication rule storage unit 72 notifies other functional blocks (for example, the authentication state management unit 73) in the user authentication management device 7 of the authentication rule.

The authentication rule will be described in the following. FIG. 5 is a diagram illustrating an authentication rule. FIG. 6 is a diagram illustrating correspondence of an authentication method with an authentication element. The authentication rule storage unit 72 stores a table of authentication levels and authentication elements shown in FIG. 5 and a table of authentication elements and authentication methods shown in FIG. 6 as an authentication rule. In the present embodiment, FIGS. 5 and 6 show separate tables, which may also be provided as a single table, if an authentication method is specified for each authentication level.

Authentication rules define rules that determine respective authentication levels as a combination of authentication elements. Authentication elements include, for example, memory authentication, possession authentication, and biometrics authentication. The authentication method for memory authentication is, for example, password authentication. The authentication methods for possession authentication are, for example, smartphone key authentication and fob key authentication. The authentication method of biometrics authentication is, for example, face authentication.

Multiple information security levels are set for the authentication rule. As for an authentication rule, for example, an authentication level 1, an authentication level 2, and an authentication level 3 are set in ascending order of the information security level. For example, authentication levels may be set based on the National Institute of Standards and Technology's guidelines for electronic authentication or based on similar authentication levels. That is, the authentication rule defines one or more authentication elements for each authentication level. For example, an authentication level with the lowest security level (authentication level 1) requires a single authentication element, an authentication level higher than the lowest security level requires multiple authentication elements, and an authentication level with the highest security level requires multiple authentication elements, respectively having a hardware encryption module that has physical security. A hardware encryption module is also called a hardware security module, and is, for example, a device that has all or a part of an encryption function and/or a signature function, with an encryption key stored therein (in the device provided as hardware).

For the authentication level 1 (may simply be called "level 1"), a first authentication element is specified. As a first authentication element, for example, memory authentication and possession authentication are adopted. In the authentication level 1, the authentication level is satisfied by either memory authentication or possession authentication.

For the authentication level 2 (may also be called level 2), a first authentication element and a second authentication element are specified. In the authentication level 2, for example, possession authentication (as a first authentication element) and memory authentication (as a second authentication element), or possession authentication (as a first authentication element) and biometrics authentication (as a second authentication element) are adopted. In the authentication level 2, the authentication level is satisfied by either (1) fob key authentication or smartphone key authentication and password authentication, or (2) fob key authentication or smartphone key authentication and face authentication.

For the authentication level 3 (may also be called level 3), a first authentication element and a second authentication element are specified. In the authentication level 3, for example, possession authentication (as a first authentication element) and memory authentication (as a second authentication element), or possession authentication (as a first authentication element) and biometrics authentication (as a second authentication element) are adopted. In the authentication level 3, the authentication level is satisfied by either (1) smartphone key authentication and password authentication, or (2) smartphone key authentication and face authentication.

Level 2 and level 3 described above have different requirements for possession authentication. Specifically, in possession authentication of level 3, it is necessary to have a hardware encryption module having physical security. Level 3 possession authentication corresponds to, for example, smartphone key authentication. In other words, smartphone key authentication corresponds to a hardware encryption module with physical security.

In level 2 and level 3, in order to satisfy the authentication rule, it is necessary for the first authentication element and the second authentication element to authenticate the same user. For example, if the user authenticated by each of the first authentication element and the second authentication element is an (i.e., the same) owner of a vehicle, the authentication rule is satisfied. On the other hand, if the user authenticated by the first authentication element is an owner of a vehicle and the user authenticated by each of the second authentication elements is an owner's family, the authentication rule is not satisfied.

The user storage unit 71 will be described.

The user storage unit 71 stores and manages the user attribute definition and the identity information. The user attribute definition can be set and updated by the server 3. The identity information can be registered and updated by the server 3 or by the authentication terminal 4 (for example, a smartphone). The user storage unit 71 can notify the identity information to other functional blocks (for example, the authentication state management unit 73) in the user authentication management device 7.

The user attribute definition will be described. The user attribute definition specifies attributes of a user who can use the vehicle. User attributes include, for example, owners, families, guests, and service providers. The information indicated by the user attributes is attribute information.

The identity information is described. FIG. 4 illustrates identity information. The identity information includes user information and information associated with the authentication information of each authentication terminal 4 (i.e., a management ID of the authentication terminal 4) for each user. Note that the user information is information that identifies a user including (i.e., associated with) a user ID and user attributes. In other words, the user information includes user identification information and attribute information. The identity information is stored in the user storage unit 71, and may continue to be stored even after an authentication period by the authentication terminal 4 has passed (i.e., expired). Alternatively, the identity information may be stored in the user storage unit 71 and automatically deleted after the authentication period by the authentication terminal 4 has expired.

The function of the authentication state management unit 73 is described.

The authentication state management unit 73 generates a user authentication state which may also be referred to as an authentication state). When the function control application requests an update of the user authentication state, the authentication state management unit 73 requests each authentication terminal 4 to authenticate. The authentication state management unit 73 generates a user authentication state based on the authentication result of the authentication terminal 4, the authentication rule, and the identity information. The authentication state management unit 73 notifies the function control application of the generated user authentication state.

The user authentication state includes, for example, information on a user ID (also referred to as user identification information), user attributes, and an authentication level. The user authentication state may include information about an authentication area. The user authentication state generated by the authentication state management unit 73 is transmitted to the function control application.

The function control application (may also be simply called an application) determines whether or not a function of the vehicle is executable, i.e., whether or not a function by a function control application has a permission of execution. The function control application may be, for example, a program stored in a memory 52 of the second ECU 5, and the function control application is executed when the CPU 51 executes the program. The function control application may be stored in other storage medium. Further, the program of the function control application may be executed by the CPU 21 or may be executed by other CPU. The function control application may be partially or wholly configured/provided as hardware. In the present embodiment, for convenience of explanation, it is described that the user authentication management device 7 and the function control application are executed in different ECUs or CPUs, but they may be executed in the same ECU or CPU.

The function control application can set the authorization policy by the server 3.

The function control application requests the user authentication management device 7 for the latest user authentication state. The timing of requesting the user authentication management device 7 to update the authentication state can be set for each function control application. The function control application may request an update of the authentication state every time it is executed, or may request an update of the authentication state at predetermined time intervals. When requesting the user authentication management device 7 for the authentication state, the function control application may notify the user authentication management device 7 of information regarding the authentication level, the user attribute, and the authentication area. Alternatively, the function control application may notify the user authentication management device 7 of the information regarding the authentication level and the user attribute when requesting the user authentication management device 7 for the authentication state. When the function control application receives the updated authentication state from the authentication state management unit 73, the function control application determines whether or not the function can be executed based on the authentication state and the authorization policy.

Note that the function control application includes all applications that control the function of the vehicle. Vehicle control targeted by the function control application includes, for example, door lock locking/unlocking, trunk (luggage space) locking/unlocking, IG(ignition)-ON, sliding door opening/closing, navigation personalization, and audio personalization.

Figure 7:
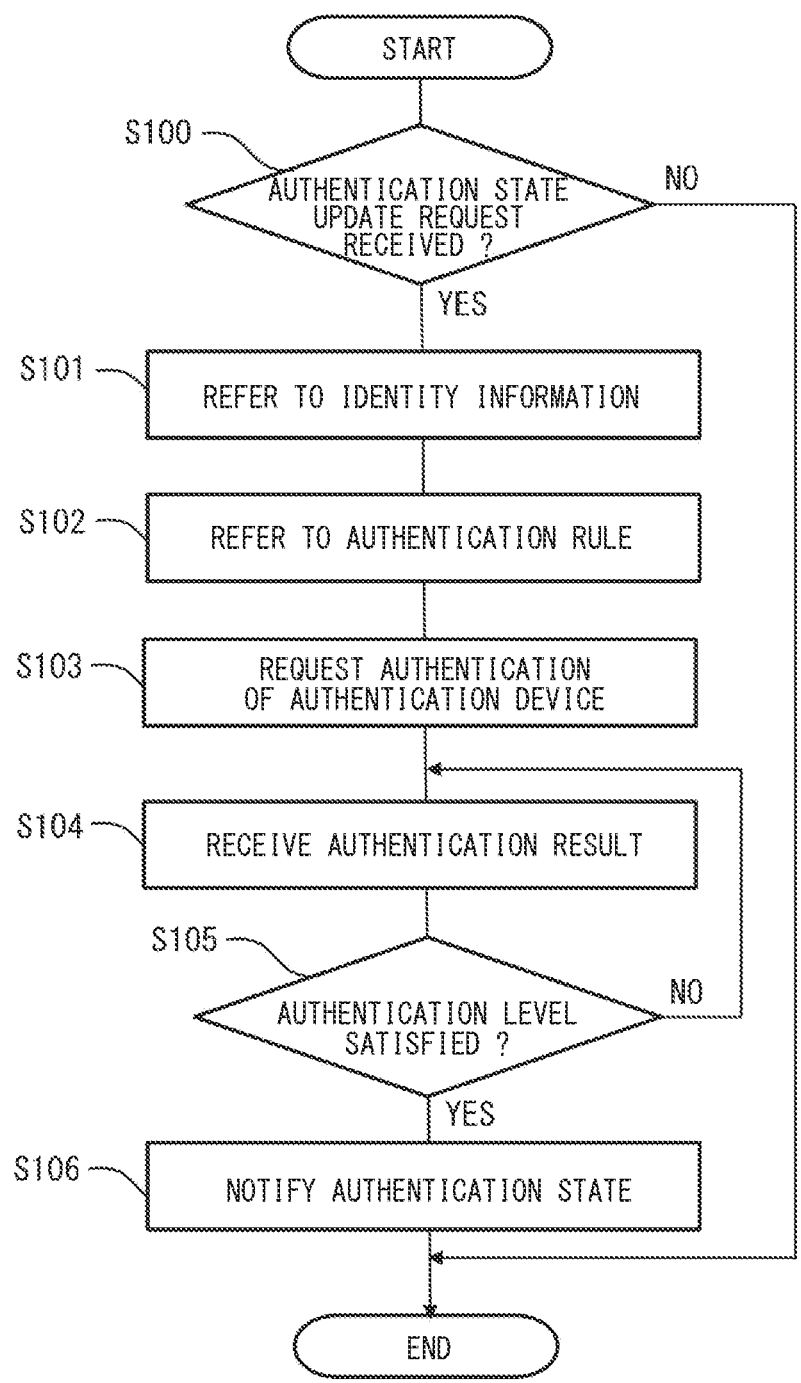
FIG. 7 is a flowchart for generating an authentication state by the user authentication management device.

Hereinafter, an authentication state generation process performed by the user authentication management device 7 is described. FIG. 7 is a flowchart for generating an authentication state by the user authentication management device 7. The authentication state generation process is performed, for example, at predetermined intervals.

In S100, it is determined whether or not a request for updating an authentication state (i.e., an authentication state update request, hereafter) is received from a function control application. When it is determined that an authentication state update request is received, the process proceeds to S101. When it is determined that an authentication state update request is not received, the authentication state generation process ends.

In S101, identity information stored in the user storage unit 71 is read (i.e., is referred to). In S102, an authentication rule stored in the authentication rule storage unit 72 is acquired (i.e., is referred to). Based on attribute information and authentication level information included in the authentication state update request, a management ID of the authentication terminal 4, to which authentication (of the user authentication management device 7) is requested, is acquired.

In S103, the user authentication management device 7 requests the authentication terminal 4 to authenticate an authentication device or devices. Note that, if there are multiple users who have an execution authority to execute the function control application, for all the users who are registered in the identity information and have the authority to execute the function control application, the management ID of the authentication terminal 4 associated with each of those users may be simultaneously transmitted to each of the authentication terminals 4, and whether the authentication level is satisfied may be determined by (i.e., with reference to) a notification from an authentication terminal 4 that has first notified the user authentication management device 7 of successful authentication.

In S104, an authentication result transmitted from each of the authentication terminals 4 is received. The authentication result includes information indicating that the authentication is successful or unsuccessful. Alternatively, the authentication result may be transmitted only when the authentication is successful, without transmitting the result when the authentication is unsuccessful.

In S105, it is determined whether or not the authentication level is satisfied based on the authentication rule read in S102 and the received authentication result. When it is determined that the authentication level is not satisfied, the process returns to S104 and waits for the authentication result thereafter. When it is determined that the authentication level is satisfied, the process proceeds to S106.

In S106, the updated authentication state is generated. The authentication state at least includes information about a user ID, user attributes and an authentication level. Then, the updated authentication state, which has been generated in the above-described manner, is notified to the function control application. Note that information of the updated authentication state may be notified only to the function control application that requested the update of the authentication state in S100, or may be notified to other active or all function control applications. When the authentication state is notified, the authentication state generation process ends.

Figure 8:
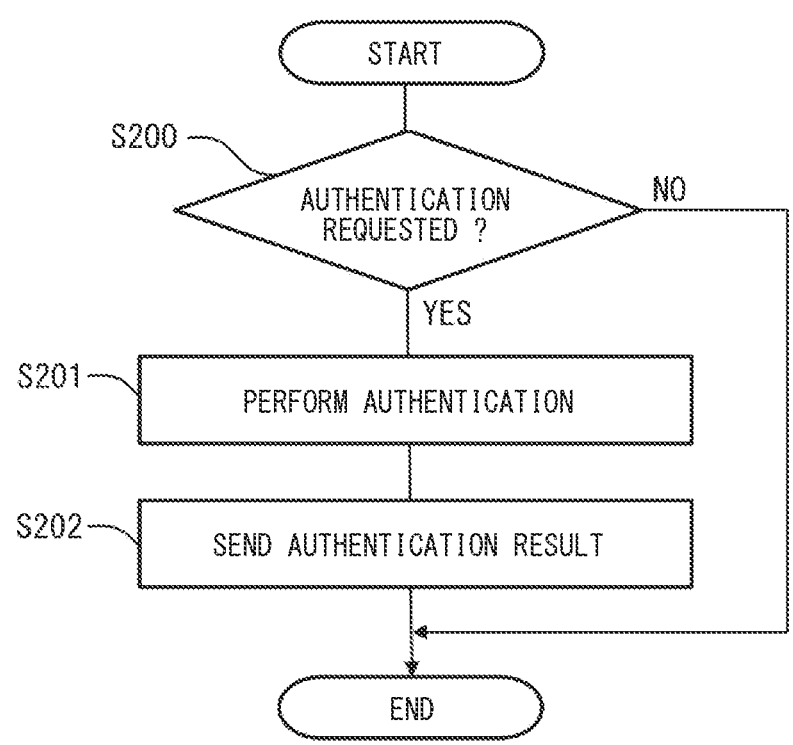
FIG. 8 is a flowchart for transmitting an authentication result by an authentication terminal.

FIG. 8 is a flowchart of a process for transmitting an authentication result by the authentication terminal 4. Since an authentication process performed by the authentication terminal 4 differs depending on the type of the authentication terminal 4, only an outline of the authentication process performed by the authentication terminal 4 is described in the present embodiment. The authentication process is performed by a control device of the authentication terminal 4 at a predetermined cycle. Alternatively, the authentication process may be started when the user authentication management device 7 requests the authentication terminal 4 for authentication. Alternatively, the same may be started when the user operates the authentication terminal 4 to start the authentication.

In S200, it is determined whether authentication is requested. When it is determined that authentication is not requested, the authentication process ends. When it is determined that the authentication is requested, the process proceeds to S201. In S201, authentication is performed according to a procedure and method defined for each of the authentication terminals 4. In S202, an authentication result is notified (i.e., sent) to the user authentication management device 7. The authentication result includes information indicating that the authentication is successful or unsuccessful. Alternatively, an authentication result may be notified to the user authentication management device 7 only when the authentication is successful, with no notification of the authentication result when the authentication is unsuccessful. When the authentication is successful, the authentication terminal 4 notifies, to the user authentication management device 7, a management ID of the authenticated terminal 4 that has performed the authentication as the authentication result. After sending the authentication result, the authentication process ends.

Figure 9:
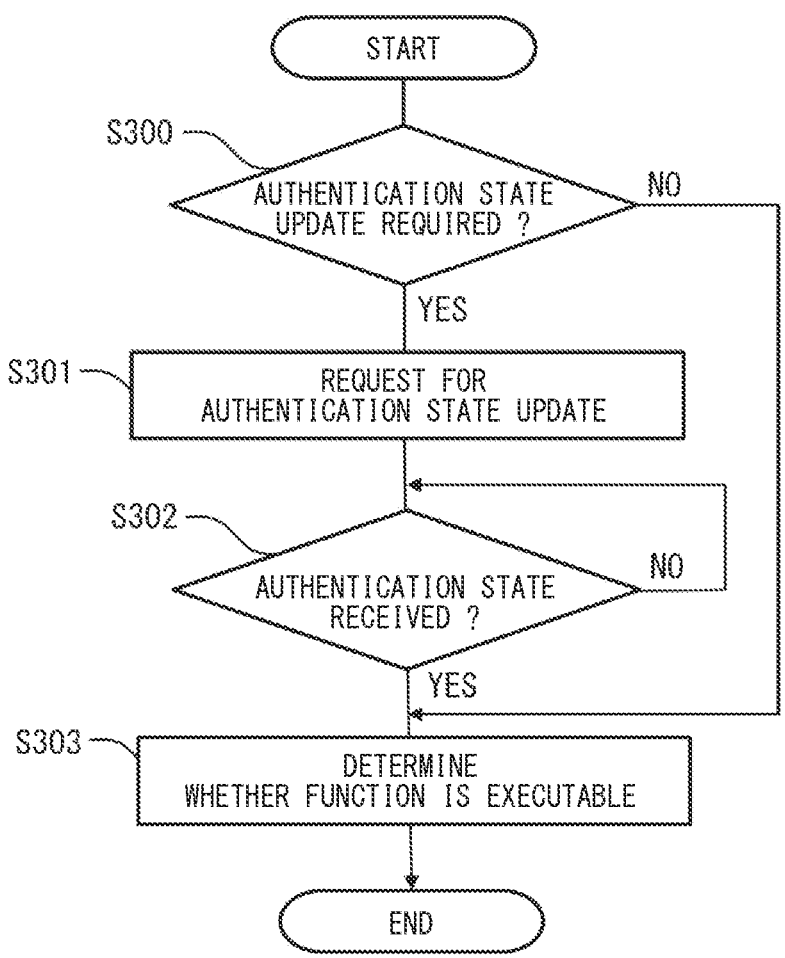
FIG. 9 is a flowchart for determining whether or not a function of a function control application is executable.

FIG. 9 is a flowchart for determining whether or not a function of a function control application is executable. An authentication state update process of FIG. 9 starts when a user requests for an execution of a function of a function control application. In S300, it is determined whether or not it is required to update an authentication state. Whether or not an update of the authentication state is required depends on the function control application. For example, the latest authentication state may be requested for each time a user tries/intends to execute a function of a function control application, and the update of the authentication state may be performed upon such a request. Alternatively, a function control application may request for an update of the authentication state after lapse of every predetermined time. Alternatively, when a cumulative operation time of a function control application exceeds a predetermined time, an update of the authentication state may be requested for. When it is determined that an update of the authentication state is required, the process proceeds to S301. When it is determined that an update of the authentication state is not required, the authentication state update process proceeds to S303.

In S301, the function control application requests the user authentication management device 7 to update an authentication state. In S302, it is determined whether or not the user authentication management device 7 has notified the function control application of the updated authentication state. When the updated authentication state has not been received by the function control application, S302 is repeated. When the updated authentication state is notified to the function control application, the process proceeds to S303. In S303, based on the latest, updated authentication state and the authorization policy notified in S302 or the stored authentication state and authorization policy, it is determined whether or not to execute the function requested by the user (i.e., whether a function is executable), and the process ends.

Modification Examples

Figure 10:
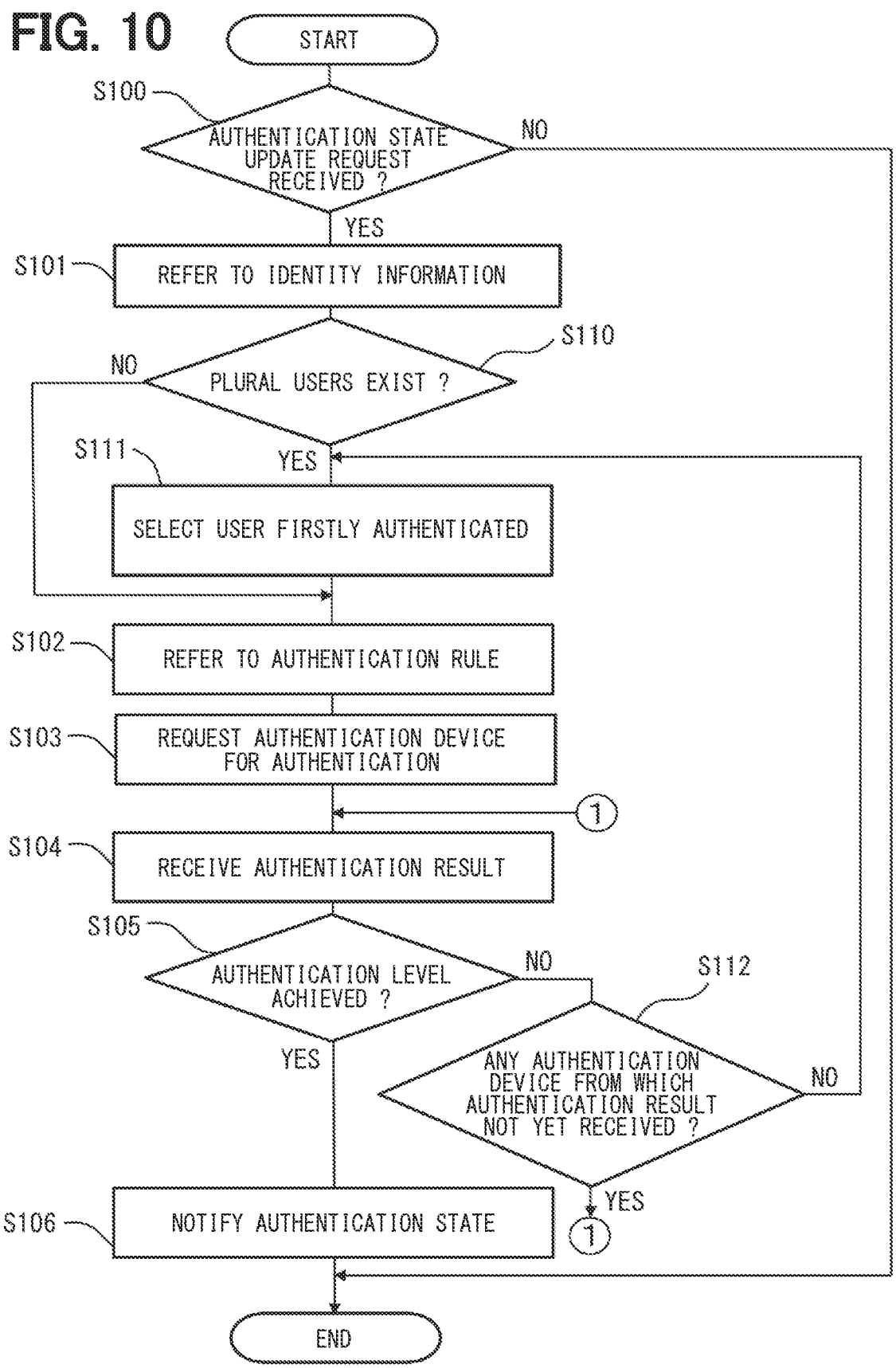
FIG. 10 is a flowchart for generating the authentication state by the user authentication management device.

FIG. 10 is a modification example of the authentication state generation process performed by the user authentication management device 7. In the modification example, it is determined whether or not there are a plurality of users who have the execution authority of the function control application. Hereinafter, the points different from the authentication state generation process described with reference to FIG. 7 are mainly discussed. After S101, in S110, it is determined whether or not a plurality of users exist from the identity information and the attribute information specified by the function control application. If there is only one user, the process proceeds to S102. If there are a plurality of users, the process proceeds to S111, and selects a user firstly authenticated (i.e., a user who receives a request for authentication by an authentication device) according to a predetermined condition. The predetermined condition may be, for example, a predetermined priority order from an owner, a family, a guest, to a service provider, or an ascending order of the management ID, or an order set by the user. S102 to S105 are the same as the above-described authentication state generation process. If it is determined in S105 that the received authentication result does not satisfy the authentication level, the process proceeds to S112.

In S112, it is determined whether or not there is an authentication terminal 4 from which an authentication result is not yet received. Since an authentication is requested for to each of the authentication terminals 4 in S103, it is determined in S112 whether or not an authentication result is received from each of the authentication terminals 4 that requested an authentication. When it is determined that there is an authentication terminal 4 from which the authentication result is received, the process proceeds (i.e., returns) to S104, and waits for a reception of the authentication result therefrom. When it is determined that there is no authentication terminal 4 from which an authentication result is received, the process proceeds to S111. In S111 in such case, a user who has not yet requested for the authentication is selected as a recipient of a management ID of the authentication terminal 4.

Practical Examples

Hereinafter, an authentication process when a user starts a function control application X of the vehicle with an intention to execute a function X1 is described. Note that, before a vehicle is handed over from a dealer (automobile dealer) to an owner (user), it is assumed that an initial authentication rule is set in the authentication rule storage unit 72, and an initial user attribute definition is set in the user storage unit 71. It is also assumed that a user ID is registered in advance at the dealer, for example. It is also assumed that a password, a fob key, a smartphone key, and face recognition are registered for the owner. It is also assumed that a password, smartphone key, and face recognition are registered for the owner's family.
(Case 1)
An authentication process when the function X1 included in the function control application X is executed by one user is described as an example "Case 1." Specifically, the case 1 involves a situation where the owner performs an operation to execute the function control application X at a driver's door (i.e., at a position just outside of the vehicle near a door beside a driver's seat) to use the function X1.

It is assumed that the function control application X has requested for an update of the authentication state according to the operation of the owner. The function control application X refers to (i.e., reads) the authorization policy, and identifies the user attributes permitting execution of the function X1 and the required authentication level. For example, suppose the authorization policy permits execution of the function X1 to the owner and family, and the authentication level required for authorization is level 1. The function control application X transmits information on the user attribute, the authentication level, and the authentication area to the authentication state management unit 73.

The authentication state management unit 73, to which the latest authentication state is requested for, refers to the identity information in the user storage unit 71, and acquires a management ID of individual authentication of the user registered in the identity information as a user attribute. The management ID for individual authentication is a management ID associated with the authentication information of a corresponding device for each authentication means, i.e., password authentication, fob key authentication, smartphone key authentication, and face authentication.

When referring to the identity information, the authentication state management unit 73 may identify an authentication terminal 4 that can be used for authentication (i.e., an authentication terminal 4 that is usable as an authentication device) based on the authentication level. For example, when the authentication level is level 1, only the first authentication element is required, which may be password authentication, fob key authentication, or smartphone key authentication. The identity information is, for example, information including user attributes and management IDs of respective authentication devices, for each user ID. The management ID of the authentication device corresponds to device identification information.

The authentication state management unit 73 requests each of the authentication terminals 4 for authentication. When requesting for authentication, the management ID of the authentication device corresponding to the authentication terminal 4 may be transmitted to the authentication terminal 4. Further, the authentication request is not transmitted to an authentication terminal 4 and the user attribute that are not specified in the authentication rule. For example, if the owner and family are registered in the identity information, the owner is required to perform password authentication, fob key authentication, and smartphone key authentication. Further, password authentication and smartphone key authentication are required for the family. Since the family does not have a fob key, that is, a family's fob key is not registered in the identity information, fob key authentication is not required for the family. Each of the authentication terminals 4 to which authentication is requested for performs authentication according to a relevant method.

Each of the authentication terminals 4 sequentially (i.e., in turns) transmits the authentication result to the authentication state management unit 73. When the authentication is successful, for example, the management ID for which the authentication is successful and the information of the authentication area are transmitted. When the authentication is unsuccessful, for example, only the information of the authentication area is transmitted. Alternatively, when the authentication is unsuccessful, the information that the authentication is unsuccessful is transmitted.

The authentication state management unit 73, which has received the authentication result from each of the authentication terminals 4, determines whether or not the authentication level specified in the authentication rule is satisfied based on the authentication result and the authentication rule. For example, when the authentication level is level 1, password authentication, fob key authentication, and smartphone key authentication are set (i.e., either of the three is required). Therefore, it is determined that the authentication level is determined as satisfied when the authentication result that the authentication is successful regarding one of the three authentication means is received.

When the authentication state management unit 73 determines that the authentication level specified in the authentication rule is satisfied, the authentication state management unit 73 generates an authentication state. The authentication state includes information on a user ID, user attributes, and authentication level. In addition, the authentication state may include information on the authentication area. The generated authentication state is notified to the function control application X. For example, the authentication state notified to the function control application X is a user ID, a user attribute=owner, an authentication area=driver's door, and authentication level=level 1. The function control application X that has received the authentication state determines whether or not execution of the function X1 is permitted based on the received user authentication state and the authorization policy.

When it is determined that the function X1 is executable (i.e., execution thereof is permitted), the function control application X executes the function X1. When it is determined that the function X1 is not executable, the function control application X does not execute the function X1. The function control application X may notify the user who has instructed the execution of the function X1, for example, when the function X1 is executed or when the function X1 is not executed.

(Case 2)

When there are a plurality of users and the authentication elements are the same for all of those users, the authentication process when one of the plurality of users executes the function X1 of the function control application X is described as an example in Case 2. Steps different from Case 1 are mainly described in the following.

Upon receiving a request for updating the authentication state from the function control application X, the authentication state management unit 73 refers to the identity information, and if a plurality of users are registered therein, plural management IDs of individual authentication stored as the identity information are transmitted to each of the authentication means. When transmitting the management ID for individual authentication to each of the authentication terminals 4, a priority may be set for the user attribute (i.e., among the owner, the family member, and the like), and, for example, the management ID corresponding to the owner may be transmitted to the authentication terminal 4 first. Alternatively, the registered management IDs for individual authentication may be transmitted all at once. When the management ID corresponding to the owner is transmitted to the authentication terminal 4 first, the subsequent authentication process is the same as in Case 1. When the authentication level is not satisfied by the authentication of the first priority user, the authentication is performed for the next user (for example, the family member). When the registered individual authentication management IDs are transmitted all at once, each of the authentication means transmits, as the authentication result, a successfully authenticated management ID that has been successfully authenticated first (from among the received management IDs). Alternatively, the authentication means may sequentially notify the authentication state management unit 73 of the authentication result for each of the [received] management IDs.

For example, when the owner and family are set as user attributes in the authentication level 1, password authentication, fob key authentication, and smartphone key authentication are performed, and, regarding first one of the three authentication means described above achieving the authentication level, an authentication state including a user, user attributes and an authentication level is generated.

(Case 3)

When there are a plurality of users having respectively different authentication elements, an authentication process described below is performed for execution of the function of the function control application by the user. Steps different from Case 1 and Case 2 will be mainly described.

Upon receiving a request for updating the authentication state from the function control application X, the authentication state management unit 73 refers to the identity information, and if a plurality of users are registered, plural management IDs of individual authentication stored as the identity information are transmitted to each of the authentication means. When transmitting the individual authentication management ID to each authentication terminal 4, it is assumed that the registered individual authentication management IDs are transmitted at the same time. In such case, each authentication means first transmits the successfully authenticated management ID (i.e., first success of authentication) as the authentication result. The authentication state management unit 73 generates an authentication state when the specified authentication level is satisfied, which is the same as the above case.

For example, when the owner and the family are set as the attribute information in the authentication level 1, the authentication state management unit 73 transmits the management ID of the individual authentication of the owner and the family registered in the identity information to the corresponding authentication terminal 4, as a request for authentication. Then, suppose that the first authentication terminal 4 (for example, fob key authentication) authenticates a fob key held by the owner, and the second authentication terminal 4 (for example, smartphone key authentication) authenticates a family smartphone. In such case, the fob key authentication terminal 4 transmits the authentication result of the successful authentication for the owner, and the smartphone key authentication terminal 4 notifies the authentication result of the successful authentication for the family. In the authentication level 1, the authentication level is achieved (i.e., satisfied) when the authentication result is received from the fob key authentication terminal 4, thereby an authentication state including the following (i.e., a user ID, user attribute=owner, authentication area=driver's door, authentication level=level 1) is generated and notified to the function control application X. Note that, when the authentication result of a successful authentication is notified from the smartphone key authentication terminal 4, an authentication state including a user ID, user attribute=family, authentication area=driver's door, and authentication level=level 1 may generated and may be notified to the function control application X.

(Case 4)

When there is only one user and the authentication level is high, an authentication process is performed in the following manner, for execution of a function included in a function control application by a user. In the following, Steps different from Case 1 are mainly described. The authentication rule stipulates/requires that both the first and second authentication elements must be authenticated. Each of the individual authentication terminals 4 requested to authenticate performs authentication, and notifies the authentication state management unit 73 of the authentication result. The authentication state management unit 73 generates an authentication state when the received authentication result satisfies the authentication level.

For example, when the owner and family are set as user attributes in the authentication level 3, smartphone key authentication is specified/required as the first authentication element, and password or face authentication is specified as the second authentication element. Therefore, even if the management ID of the fob key is registered in the identity information, it is not used for authentication. When the authentication state management unit 73 receives, for example, the authentication result of face authentication and the authentication result of smartphone key authentication, it determines that the authentication level has been reached/satisfied, and notifies the authentication state.

SUMMARY

The present disclosure can be summarized, for example, as follows. According to one aspect of the present disclosure, an authentication management method includes: storing an authentication rule or rules in which authentication levels and authentication elements are defined; storing identity information that identifies vehicle users; receiving a request for updating an authentication state from a vehicle application that controls vehicle functions; requesting an authentication terminal for authenticating a user or an authentication device possessed by the user, for an authentication of the user or the authentication device by the authentication terminal; generating the authentication state based on an authentication result by the authentication terminal, the authentication rule or rules and the identity information; and notifying the vehicle application of the generated authentication state. The stored authentication rules define a plurality of authentication levels according to security levels, and the authentication element in at least one authentication level includes possession authentication by a hardware encryption module with physical security.

Further, according to another aspect of the present disclosure, an authentication management program, controlling an electronic control device installed in a vehicle, stores (e.g., controls a computer or an electronic control unit to store) an authentication rule that defines authentication levels and authentication elements in an electronic control device mounted on a vehicle, stores identity information that identifies vehicle users, receives a request to update an authentication state from a vehicle application that controls vehicle functions, requests an authentication terminal for authenticating a user or an authentication device possessed by the user, for an authentication of the user or the authentication device by the authentication terminal, generates the authentication state based on an authentication result by the authentication terminal, the authentication rule, and the identity information, and notifies the vehicle application of the generated authentication state. The stored authentication rules define a plurality of authentication levels according to security levels, and the authentication element in at least one authentication level includes possession authentication by a hardware encryption module with physical security. Further, a computer-readable, non-transitory storage medium may store the authentication management program.

Further, according to yet another aspect of the present disclosure, a user authentication management device mounted on a vehicle includes: a first storage unit (72) that stores an authentication rule that defines authentication levels and authentication elements; a second storage unit (71) that stores identity information to identify vehicle users; and an authentication control unit (73) that
  i) receives a request for updating an authentication state from a vehicle application that controls vehicle functions,
  ii) requests an authentication terminal for authenticating a user or an authentication device possessed by the user, for an authentication of the user or the authentication device by the authentication terminal,
  iii) generates the authentication state based on an authentication result by the authentication terminal, the authentication rule, and the identity information, and
  iv) notifies the vehicle application of the generated authentication state. The stored authentication rules define a plurality of authentication levels according to security levels, and the authentication element in at least one authentication level includes possession authentication by a hardware encryption module with physical security.

Further, the authentication rule stored in the user authentication management device may define/require, for each authentication level, a single authentication element or a plurality of authentication elements. The authentication level with the highest security level may include possession authentication, which requires multiple authentication elements, respectively having a hardware encryption module that has physical security The lowest security level authentication level may require a single authentication element.

Further, the authentication level stored in the user authentication management device may be set to three levels. The authentication level with the lowest security level may be, i.e., include, memory authentication. The authentication level with a medium/intermediate security level may require either (a) possession authentication and memory authentication, or (b) possession authentication and biometrics authentication. The authentication level with the highest security level may require either (a) possession authentication by a hardware encryption module with physical security and memory authentication, or (b) possession authentication by a hardware encryption module with physical security and biometrics authentication.

Further, in the user authentication management device, memory authentication may be a password authentication, possession authentication may be a fob key authentication or a key authentication by a mobile communication terminal, and biometrics authentication may be a face authentication, possession authentication by hardware encryption module with physical security may be a key authentication by a mobile communication terminal. Further, an authentication rule stored in the first storage unit may be set by notification from the server, and the first storage unit may notify the authentication control unit of the authentication rule.

Further, the identity information may include (a) user identification information unique to a user, (b) attribute information indicating the user's attributes, and (c) device identification information which is identification information associated with the authentication information of the authentication device, and the identity information stored in the second storage unit may be changed according to notification from the server or from the authentication terminal.

Further, the authentication control unit, upon receiving an authentication state update request from a vehicle application, may refer to the identity information, may request an authentication terminal corresponding to the device identification information for authentication, and may generate an authentication state when an authentication result received from the authentication terminal satisfies the authentication rule.

Further, in case of requesting an authentication terminal for authentication of the plurality of users by (i) referring to the identity information based on the authentication state update request from a vehicle application, and (ii) requesting the authentication terminal corresponding to the device identification information for authentication, the authentication control unit may generate an authentication state for a user that has satisfied the authentication rule first among the plurality of users.

Further, in case of requesting an authentication terminal for authentication of the plurality of users by (i) referring to the identity information based on the authentication state update request from a vehicle application, and (ii) requesting the authentication terminal corresponding to the device identification information for authentication, upon having a result of such authentication, the authentication control unit may generate (a) an authentication state for a first user when the first user has successfully authenticated with a first authentication element, and may further generate (b) an authentication state for a second user when the second user has successfully authenticated with a second authentication element different from the first authentication element.

According to the configuration of the present disclosure described above, in an authentication state management system including the authentication management device which is a device added to a position between (a) an authentication process for authenticating the vehicle user or the authentication device possessed by the user and (b) an update process for updating the authentication state by the vehicle application that controls the vehicle functions, the authentication management device is enabled to centrally manage the authentication state and to ensure security, by having possession authentication of the hardware encryption module with physical security as an authentication element.

By conceptually separating the authentication process from the vehicle application, the vehicle application needs not be changed even when an authentication means in the vehicle is newly developed or changed. Further, even when a vehicle application is newly developed or changed, the authentication means in the vehicle needs not be changed. Development costs are reduced because there is no need to change both the authentication process and the vehicle application. For vehicle users, convenience is improved because new authentication methods or vehicle applications become selectable and usable. In addition, depending on the authentication level, security can be ensured by adopting a hardware encryption module with physical security, and it is possible to effectively prevent a third party from illegally executing the function of the vehicle application.

The control unit and methods thereof described in the present disclosure may be realized by a dedicated computer provided by configuring a processor and memory programmed to perform one or more functions embodied by a computer program. Alternatively, the control unit and methods thereof described therein may also be realized by a dedicated computer provided by configuring a processor with one or more dedicated hardware logic circuits. Alternatively, the control unit and methods thereof described therein may also be realized by one or more dedicated computers configured as a combination of (i) a processor and memory programmed to perform one or more functions and (ii) a processor composed of one or more hardware logic circuits. It may be realized by one or more dedicated computers configured. Further, the computer program may be stored in a computer-readable, non-transitory, tangible recording medium as an instruction to be executed by the computer.

What is claimed is:

1. A method for managing authentication comprising:

storing authentication rules that define a plurality of authentication levels according to security levels and that define authentication elements, an authentication element in at least one authentication level of the authentication levels including possession authentication by a hardware encryption module with physical security;

storing identity information that identifies a user of a vehicle;

receiving a request for updating an authentication state from a vehicle application that controls vehicle functions;

requesting an authentication terminal from a plurality of authentication terminals for authenticating the user of the vehicle or an authentication device possessed by the user, for an authentication of the user or the authentication device by the authentication terminal;

updating the authentication state based on: (i) an authentication result by the authentication terminal, (ii) at least one of the authentication rules, and (iii) the identity information; and notifying the vehicle application of the updated authentication state, wherein the requesting the authentication terminal from the plurality of authentication terminals includes determining the authentication terminal from the plurality of authentication terminals based on (i) the authentication level set to the vehicle application that is a requester of updating the authentication state, and (ii) the identity information.

2. A tangible, non-transitory computer readable storage medium storing an authentication management program for operating a computer as an electronic control device installed in a vehicle, the authentication management program comprising steps of:

storing authentication rules that define a plurality of authentication levels according to security levels and that define authentication elements in the electronic control device, an authentication element in at least one authentication level of the authentication levels including possession authentication by a hardware encryption module with physical security;

storing identity information that identifies a user of the vehicle;

receiving a request to update an authentication state from a vehicle application that controls vehicle functions;

requesting an authentication terminal from a plurality of authentication terminals for authenticating the user of the vehicle or an authentication device possessed by the user, for an authentication of the user or the authentication device by the authentication terminal, generating the authentication state based on an authentication result by the authentication terminal, the authentication rules, and the identity information, and notifying the vehicle application of the generated authentication state, wherein the requesting the authentication terminal from the plurality of authentication terminals includes determining the authentication terminal from the plurality of authentication terminals based on (i) the authentication level set to the vehicle application that is a requester of updating the authentication state, and (ii) the identity information.

3. The tangible, non-transitory computer readable storage medium storing an authentication management program of claim 2, wherein
the possession authentication includes smartphone key authentication and fob key authentication.

4. A user authentication management device mounted on a vehicle and comprising:
a first memory storing authentication rules that define a plurality of authentication levels according to security levels and that define authentication elements, an authentication element in at least one authentication level of the authentication levels including possession authentication by a hardware encryption module with physical security;
a second memory that stores identity information to identify a user of the vehicle; and
a processor configured to
i) receive a request for updating an authentication state from a vehicle application that controls vehicle functions,
ii) request an authentication terminal from a plurality of authentication terminals for authenticating the user of the vehicle or an authentication device possessed by the user, for an authentication of the user or the authentication device by the authentication terminal,
iii) generate the authentication state based on an authentication result by the authentication terminal, the authentication rules, and the identity information, and
iv) notify the vehicle application of the generated authentication state, wherein
the requesting the authentication terminal from the plurality of authentication terminals includes determining the authentication terminal from the plurality of authentication terminals based on (i) the authentication level set to the vehicle application that is a requester of updating the authentication state, and (ii) the identity information.

5. The user authentication management device of claim 4, wherein:
the stored authentication rules define at least one authentication element for each of the authentication levels,
an authentication level with a highest security level requires possession authentication provided by multiple authentication elements respectively requiring authenticity by a hardware security module with physical security, and
an authentication level with a lowest security level requires authentication provided by only one authentication element.

6. The user authentication management device of claim 4, wherein:
there are exactly three levels of authentication,
an authentication level with a lowest security level requires memory authentication,
an authentication level with an intermediate security level requires either:
(i) possession authentication and memory authentication, or
(ii) possession authentication and biometrics authentication, and
an authentication level with a highest security level requires either:

(a) (a-1) possession authentication by a hardware encryption module with physical security, and (a-2) memory authentication, or
(b) (b-1) possession authentication by a hardware encryption module with physical security and (b-2) biometrics authentication.

7. The user authentication management device of claim 6, wherein:
the memory authentication is a password authentication,
the possession authentication is a fob key authentication or a key authentication by a mobile communication terminal,
the biometrics authentication is a face authentication, and
the possession authentication by hardware encryption module with physical security is a key authentication by the mobile communication terminal.

8. The user authentication management device of claim 4, wherein:
the authentication rule stored in the first memory is set by a notification from a server, and
the first memory notifies the processor of the authentication rule.

9. The user authentication management device of claim 4, wherein:
the identity information includes
(a) user identification information unique to a user,
(b) attribute information indicating the user's attributes, and
(c) device identification information which is identification information associated with the authentication information of the authentication device, and
the identity information stored in the second memory is changed according to a notification from a server or from the authentication terminal.

10. The user authentication management device of claim 9, wherein:
upon receiving the request for updating the authentication state from the vehicle application, the processor refers to the identity information, requests the authentication terminal corresponding to the device identification information for authentication, and generates the authentication state when the authentication result received from the authentication terminal satisfies the authentication rule.

11. The user authentication management device of claim 9, wherein:
requesting an authentication terminal for authentication of a plurality of users includes: (i) referring to the identity information based on the authentication state update request from the vehicle application, and (ii) requesting the authentication terminal corresponding to the device identification information for authentication,
the processor generates the authentication state for a user that has satisfied the authentication rule first among the plurality of users.

12. The user authentication management device of claim 9, wherein:
requesting an authentication terminal for authentication of the plurality of users includes: (i) referring to the identity information based on a request for updating the authentication state from the vehicle application, and (ii) requesting the authentication terminal corresponding to the device identification information for authentication, upon having a result of such authentication, the processor generates
(a) the authentication state for a first user when the first user has successfully authenticated with a first authentication element, and further generates
(b) the authentication state for a second user when the second user has successfully authenticated with a second authentication element different from the first authentication element.

\* \* \* \* \*